US010302940B2

(12) United States Patent
Matsuura et al.

(10) Patent No.: US 10,302,940 B2
(45) Date of Patent: May 28, 2019

(54) HEAD-UP DISPLAY

(71) Applicant: NIPPON SEIKI CO., LTD., Niigata (JP)

(72) Inventors: Kazuya Matsuura, Niigata (JP); Yuta Kikuchi, Niigata (JP); Takeru Kawai, Niigata (JP); Takashi Yamazoe, Niigata (JP); Yuichi Takahashi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/572,005

(22) PCT Filed: Apr. 14, 2016

(86) PCT No.: PCT/JP2016/061967
§ 371 (c)(1),
(2) Date: Nov. 6, 2017

(87) PCT Pub. No.: WO2016/181749
PCT Pub. Date: Nov. 17, 2016

(65) Prior Publication Data
US 2018/0143431 A1    May 24, 2018

(30) Foreign Application Priority Data
May 13, 2015 (JP) .................................. 2015-097999

(51) Int. Cl.
*G09G 5/00* (2006.01)
*G02B 27/01* (2006.01)
(Continued)

(52) U.S. Cl.
CPC .......... *G02B 27/0101* (2013.01); *B60K 35/00* (2013.01); *B60K 37/06* (2013.01);
(Continued)

(58) Field of Classification Search
CPC ................ G02B 27/01; G02B 27/0101; G02B 27/0149; G02B 2027/014;
(Continued)

(56) References Cited

U.S. PATENT DOCUMENTS 3,533,104 A * 10/1970 Habegger ................. G01S 1/02
                                                            342/178
5,734,357 A *  3/1998 Matsumoto ............ G02B 27/01
                                                              345/7
(Continued)

FOREIGN PATENT DOCUMENTS

JP    2003-237412 A    8/2003
JP    2007-148092 A    6/2007
(Continued)

OTHER PUBLICATIONS

Search Report issued in corresponding International Patent Application No. PCT/JP2016/061967, dated Jul. 5, 2016.

*Primary Examiner* — Joe H Cheng
(74) *Attorney, Agent, or Firm* — McDermott Will & Emery LLP

(57) ABSTRACT

Provided is a head-up display which facilitates the differentiation of information contained in a stereoscopic display and which enables display having a stereoscopic effect, by rotating either a first display surface of a first image generation unit corresponding to a first virtual image display surface, or a reflection unit for aiming first display light emitted from the first image generation unit at a front window shield (transmission/reflection unit), to change the angle formed by the first virtual image display surface and a second virtual image display surface.

9 Claims, 7 Drawing Sheets

(51) Int. Cl.
*B60K 35/00* (2006.01)
*B60K 37/06* (2006.01)
*H04N 5/64* (2006.01)
*G06K 9/00* (2006.01)

(52) U.S. Cl.
CPC ......... *G02B 27/01* (2013.01); *G06K 9/00671* (2013.01); *H04N 5/64* (2013.01); *G02B 2027/014* (2013.01); *G02B 2027/0154* (2013.01); *G02B 2027/0181* (2013.01)

(58) Field of Classification Search
CPC .... G02B 2027/0154; G02B 2027/0181; G09G 5/00; B60K 35/00; B60K 37/06; G02F 1/133606; H04N 5/64; G60K 9/00; G60K 9/00671
See application file for complete search history.

(56) References Cited

U.S. PATENT DOCUMENTS

| | | | |
|---|---|---|---|
| 7,167,779 B2* | 1/2007 | Kashiwada | G02B 27/01 340/435 |
| 7,224,325 B2* | 5/2007 | Nagano | G02B 27/0101 345/7 |
| 2003/0016451 A1* | 1/2003 | Aoki | G02B 27/01 359/633 |
| 2009/0160736 A1* | 6/2009 | Shikita | G02B 27/0101 345/7 |
| 2010/0067118 A1* | 3/2010 | Takahashi | G02B 27/01 359/633 |
| 2010/0271698 A1* | 10/2010 | Kessler | G02B 27/0081 359/479 |
| 2015/0268468 A1* | 9/2015 | Masuda | B60K 35/00 345/589 |
| 2017/0146803 A1* | 5/2017 | Kishigami | G02B 5/30 |
| 2017/0160545 A1* | 6/2017 | Sugiyama | B60K 35/00 |
| 2017/0225568 A1* | 8/2017 | Kasahara | B60K 35/00 |
| 2017/0299922 A1* | 10/2017 | Matsuura | B60K 35/00 |

FOREIGN PATENT DOCUMENTS

| | | |
|---|---|---|
| JP | 2008-268485 A | 11/2008 |
| JP | 2012-037241 A | 2/2012 |

* cited by examiner

[Fig. 1]
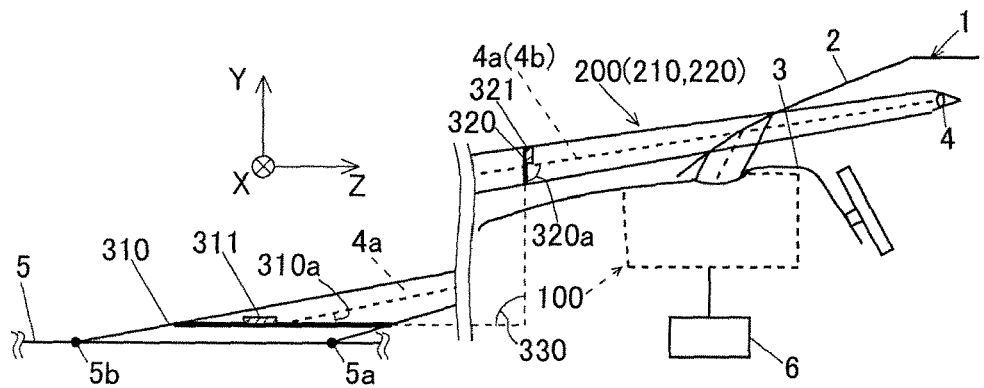
[Fig. 2]
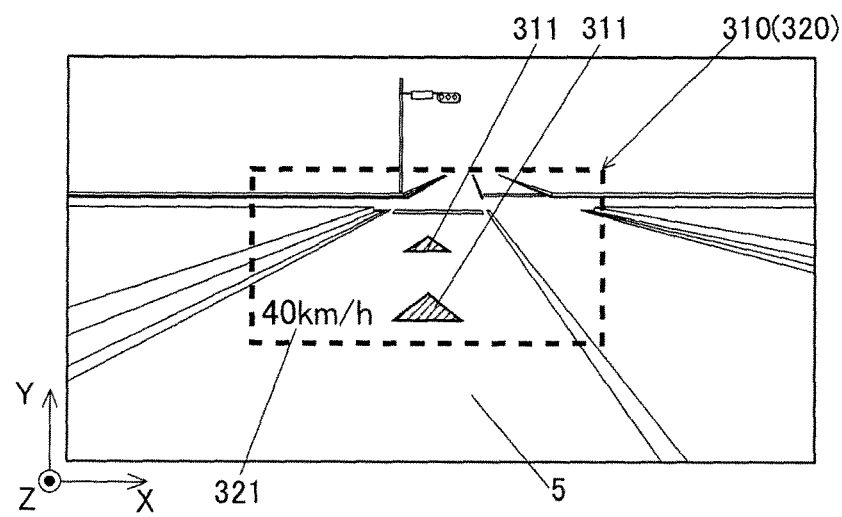
[Fig. 3]
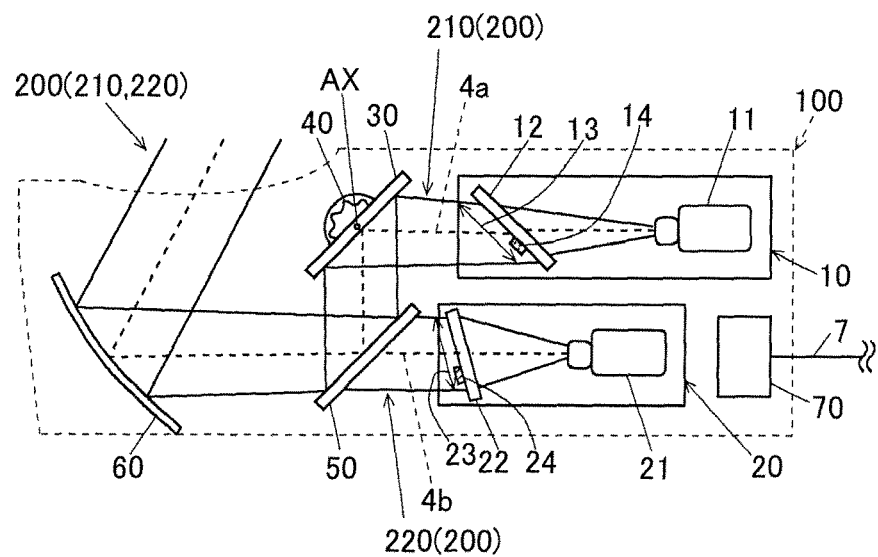

[Fig.4]
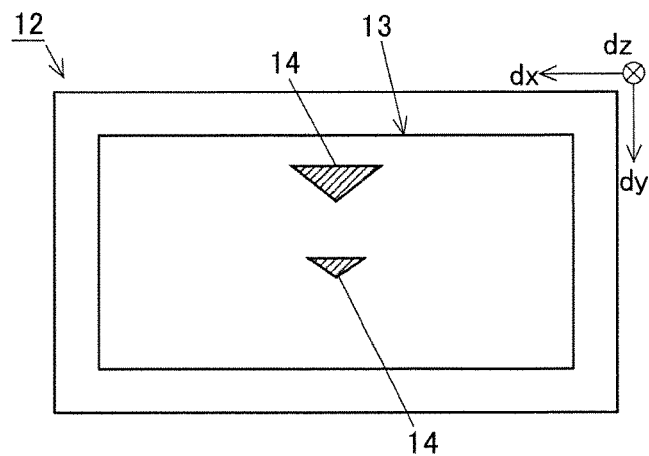
[Fig.5]
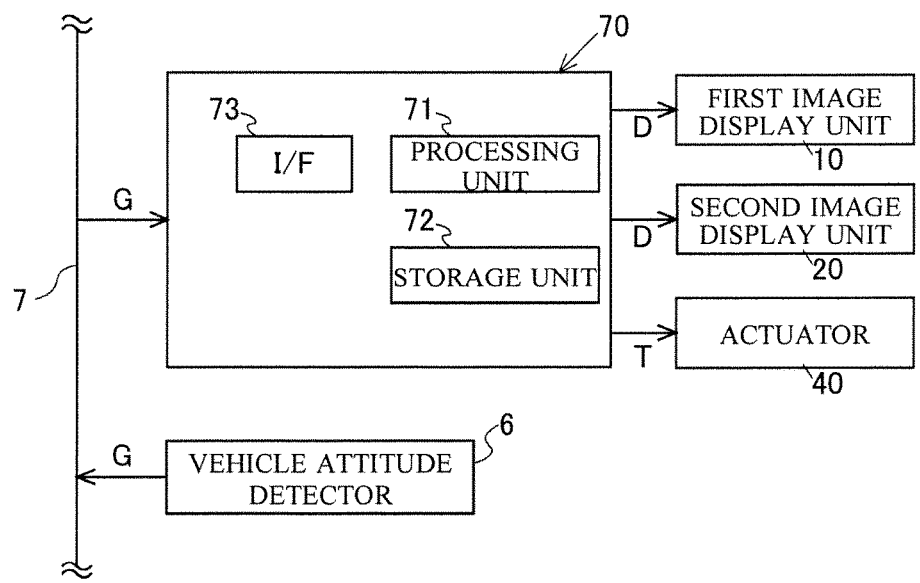

[Fig.6]
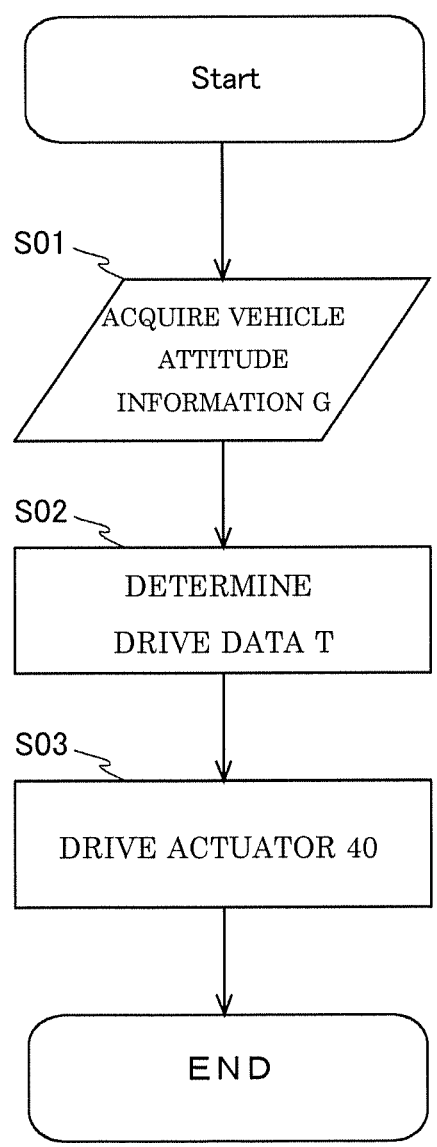

[Fig. 7A]
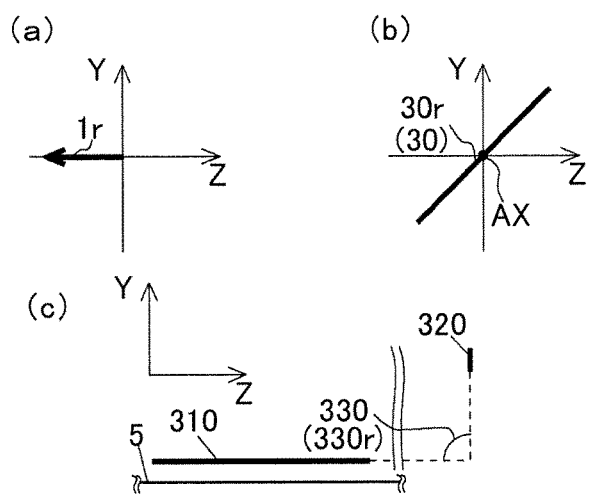
[Fig. 7B]
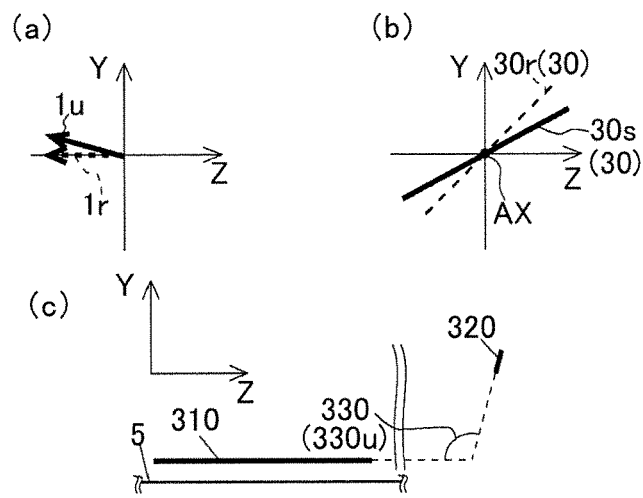
[Fig. 7C]
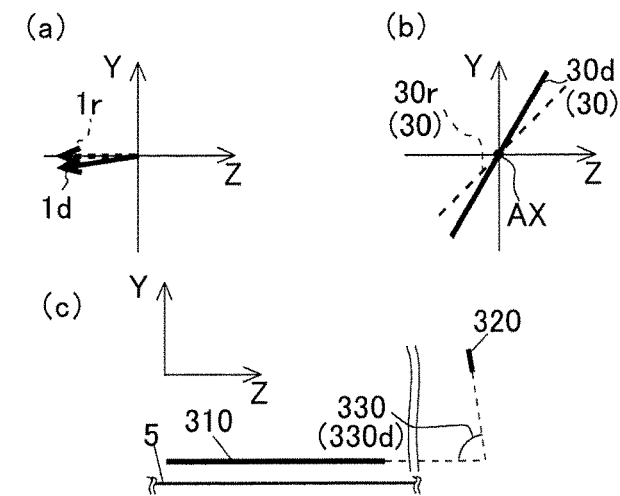

[Fig. 8A]
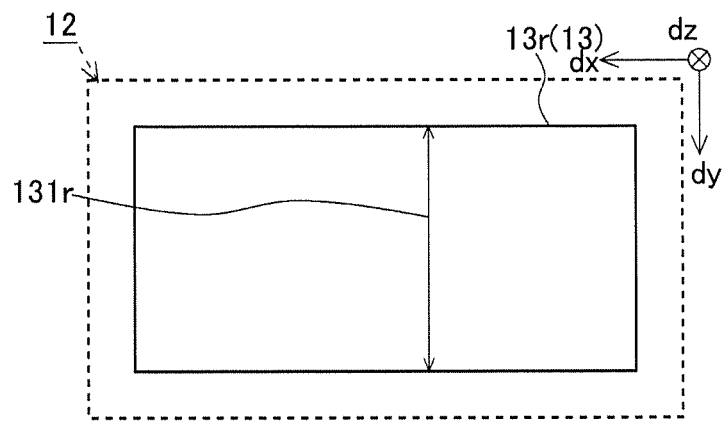
[Fig. 8B]
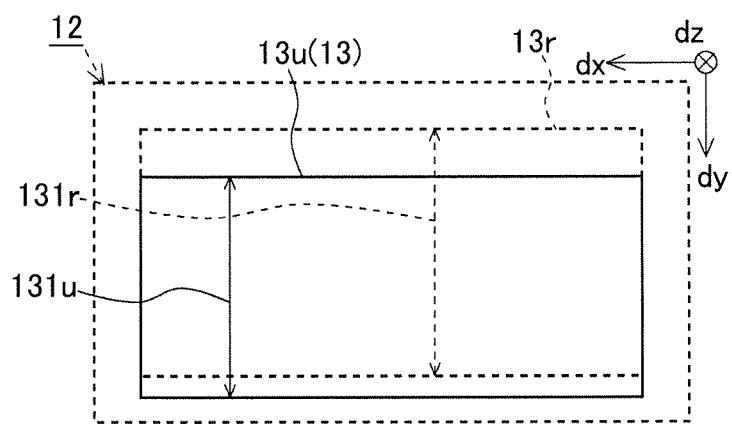
[Fig. 8C]
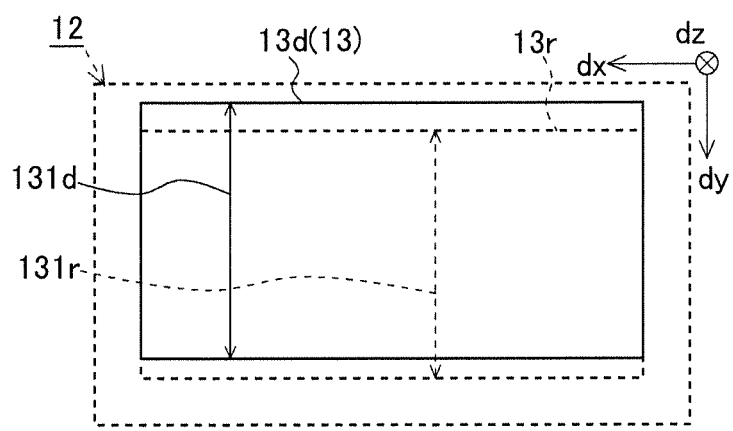

[Fig.9]
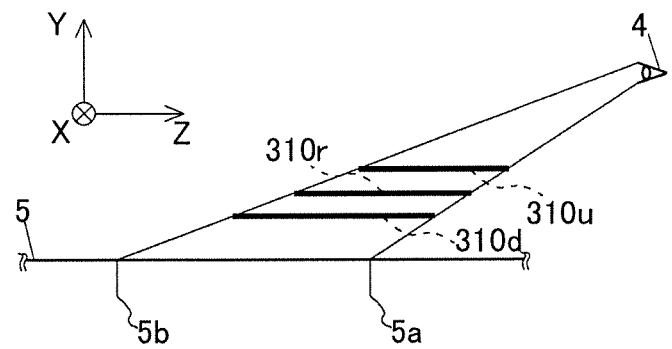
[Fig.10]
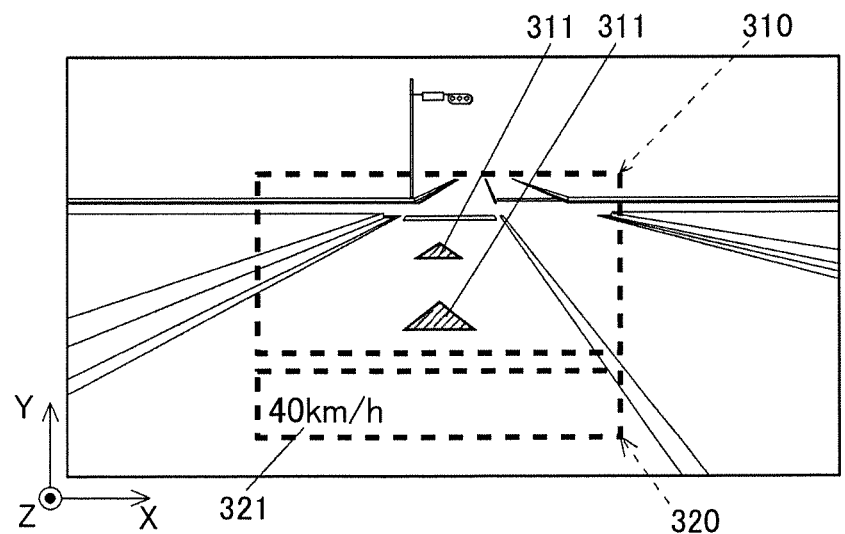

[Fig.11]
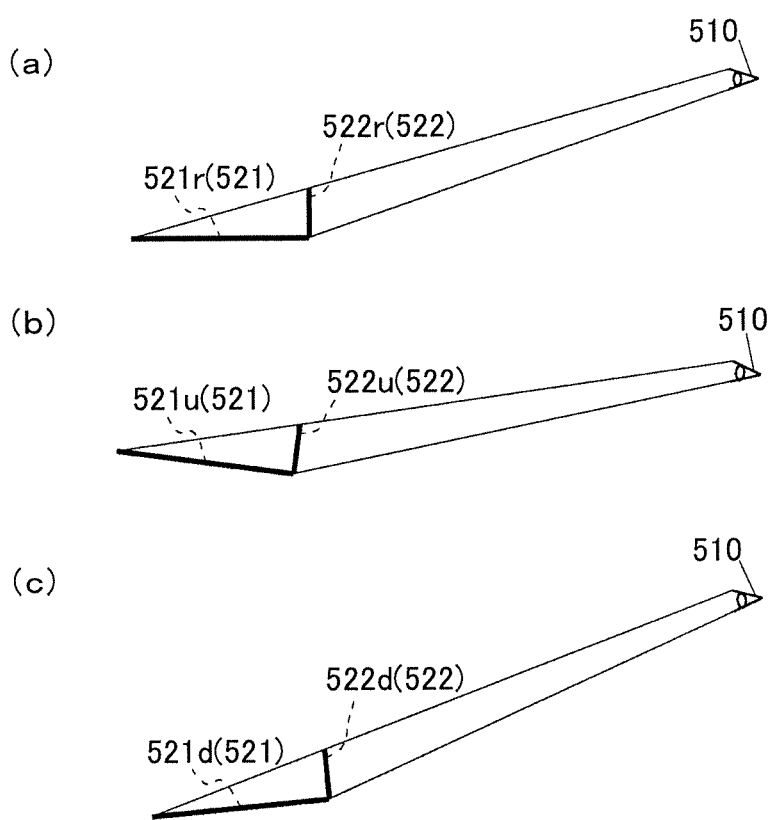

HEAD-UP DISPLAY

CROSS REFERENCE

This application is the U.S. National Phase under 35 U.S.C. § 371 of International Application No. PCT/JP2016/061967, filed on Apr. 14, 2016, which claims the benefit of Japanese Application No. 2015-097999, filed on May 13, 2015, the entire contents of each are hereby incorporated by reference.

TECHNICAL FIELD

The present invention relates to a head-up display for displaying a virtual image.

BACKGROUND ART

A head-up display generates an augmented reality (AR: Augmented Reality (AR)), which adds information to an actual scene and emphasizes a specific object in an actual scene by displaying an overlapping image on a scene (real view) in front of a vehicle, and contributes to safe and comfortable vehicle operation by accurately providing desired information while minimizing an eye movement of a viewer driving a vehicle.

For example, Patent Literature 1 discloses a head-up display, which comprises two image display units and displays an image on these image display units to thereby generate a virtual image on two imaginary virtual image display surfaces. In the head-up display, display surfaces of first and second image display units are arranged at different angles with respect to a a viewer's line of sight so that two virtual image display surfaces generated by the first and second image display units are recognized at different viewing angles. Specifically, the head-up display generates one virtual image display surface to be substantially vertical to a viewer's line of sight, and the other virtual image display surface to be inclined in a horizontal direction from the one virtual image display surface. That is, two virtual image display surfaces are not parallel, but have a predetermined angle. As two virtual image display surfaces are inclined by a predetermined angle, a viewer can sterically recognize a virtual image displayed on a respective virtual image display surface.

CITATION LIST

Patent Literature

Patent Literature 1: Japanese Unexamined Patent Application Publication No. 2012-037241

SUMMARY OF THE INVENTION

Problems to be Solved by the Invention

However, in the head-up display disclosed in Patent Literature 1, an angle between two virtual image display surfaces is fixed. Therefore, for example, even when a pitch angle of a vehicle changes due to a behavior such as acceleration and deceleration of a vehicle, the angle between two virtual image display surfaces is maintained, and an image is merely visually recognized with a display position shifted with respect to an actual scene outside the vehicle. As described above, when each virtual image displayed on two virtual image display surfaces shifts from an actual scene even if a vehicle attitude (pitch angle) changes, it becomes difficult to discriminate between information displayed on one virtual image and information displayed on the other virtual image display surface. In other words, there is a problem that it is difficult to recognize which information is displayed on one virtual image display surface and which is the information displayed on the other virtual image display surface, and a stereoscopic impression is diminished.

FIG. 11 shows an example of a state of pitch angles of three vehicles as an example showing a position of a virtual image display surface when a vehicle pitch angle changes. FIG. 11 (*a*) shows the positions of a first virtual image display surface 521 *r* and a second virtual image display surface 522 *r* when a vehicle pitch angle is substantially parallel to a road surface. FIG. 11 (*b*) shows the positions of a first virtual image display surface 521 *u* and a second virtual image display surface 522 *u* when a vehicle pitch angle faces upward in a vertical direction from a road surface. FIG. 11 (*c*) shows the positions of a first virtual image display surface 521 *d* and a second virtual image display surface 522 *d* when a vehicle pitch angle faces downward in a vertical direction from a road surface. In a conventional head-up display, a relative angle between a first virtual image display surface 521 and a second virtual image display surface 522 does not change. Thus, it is difficult to recognize which one of the visually recognized information is displayed on the first virtual image display surface 521 (the second virtual image display surface 522), and a stereoscopic impression is diminished.

An object of the present invention is to provide a head-up display, which makes it easy to differentiate information included in a stereoscopic display and enables a display with a stereoscopic effect.

Means for Solving the Problem

The present invention adopts the following means in order to solve the problem. A head-up display according to the present invention generates first and second virtual image display surfaces which are provided so as to have a predetermined angle and are capable of respectively displaying virtual images, changes an angle formed between the first virtual image display surface and the second virtual image display surface, by rotating at least one of a first display surface of a first image generation unit corresponding to a first virtual image display surface, or a relay optics that directs the first display light emitted from the first image generation unit to a transmissive reflector. Accordingly, in the head-up display of the present invention, the angle formed by the first virtual image display surface and the second virtual image display surface changes based on the vehicle attitude of the vehicle, a viewer is allowed to recognize which one of the virtual images is the information displayed on the first virtual image display surface or the second virtual image display surface, and it is possible to recognize more stereoscopically the first virtual image and the second virtual image displayed on the first virtual image display surface and the second virtual image display surface.

A head-up display according to the present invention, mounted on a vehicle and capable of displaying a virtual image respectively on a first virtual image display surface and a second virtual image display surface by projecting display light onto a transmissive reflector, comprising: a first image display unit comprising a first display surface corresponding to the first virtual image display surface and emitting first display light for displaying the virtual image from the first display surface; a second image display unit comprising a second display surface corresponding to the second virtual image display surface and emitting second display light for displaying the virtual image from the second display surface; a relay optics that directs to the transmissive reflector the first and second display lights emitted from the first and second image display units; an actuator capable of adjusting an angle on a real space where the first virtual image display surface is generated, by rotating at least one of the first display surface and the relay optics; and a control unit that controls the actuator and changes an angle formed between the first virtual image display surface and the second virtual image display surface.

Effect of the Invention

It is possible to facilitate differentiation of information included in a stereoscopic display and display an image with a stereoscopic effect.

BRIEF DESCRIPTION OF THE DRAWINGS

FIG. 1 is a diagram illustrating examples of a first virtual image display surface and a second virtual image display surface generated by the head-up display of the present invention.

FIG. 2 is a diagram showing an example of a state in which an actual scene and a virtual image displayed by the head-up display shown in FIG. 1 are visually recognized when facing the front of a vehicle from a driver's seat.

FIG. 3 is a diagram showing an example of a configuration of the head-up display shown in FIG. 1.

FIG. 4 is a diagram showing an example in which a first image is displayed on the first screen shown in FIG. 2.

FIG. 5 is a diagram showing an example of a configuration of a control unit shown in FIG. 2.

FIG. 6 is a flowchart illustrating the operation of the head-up display shown in FIG. 2.

FIG. 7A is a view for explaining an example of an angle formed by the first and second virtual image display surfaces generated by the head-up display shown in FIG. 2 when a pitch angle of a vehicle is substantially parallel to a road surface: (a) shows an example of a pitch angle of a vehicle, (b) shows an example of an angle of a reflector, and (c) shows an arrangement of the first and second virtual image display surfaces.

FIG. 7B is a view for explaining an example of an angle formed by the first and second virtual image display surfaces generated by the head-up display shown in FIG. 2 when a pitch angle of a vehicle faces upward in a vertical direction: (a) shows an example of a pitch angle of a vehicle, (b) shows an example of an angle of a reflector, and (c) shows an arrangement of the first and second virtual image display surfaces.

FIG. 7C is a view for explaining an example of an angle formed by the first and second virtual image display surfaces generated by the head-up display shown in FIG. 2 when a pitch angle of a vehicle faces downward in a vertical direction: (a) shows an example of a pitch angle of a vehicle, (b) shows an example of an angle of a reflector, and (c) shows an arrangement of the first and second virtual image display surfaces.

FIG. 8A is a view for explaining an example of a use area when a pitch angle of a vehicle is substantially parallel to a road surface on the first display surface of the first image display unit shown in FIG. 2.

FIG. 8B is a view for explaining an example of a use area when a pitch angle of a vehicle faces upward in a vertical direction on the first display surface shown in FIG. 2.

FIG. 8C is a view for explaining an example of a use area when a pitch angle of a vehicle faces downward in a vertical direction on the first display surface shown in FIG. 2.

FIG. 9 is a view for explaining an arrangement of the first and second virtual image display surfaces according to an attitude of a vehicle in the head-up display of FIG. 2.

FIG. 10 is a view showing an example of a state in which an actual scene and a virtual image displayed by a modified example of the head-up display shown in FIG. 2 are visually recognized when facing the front of a vehicle from a driver's seat.

FIG. 11 is a view for explaining an arrangement of the first and second virtual image display surfaces according to an attitude of a vehicle in a conventional head-up display.

MODE FOR CARRYING OUT THE INVENTION

Embodiments described below are used to facilitate understanding of the present invention, and those skilled in the art should be noted that the present invention is not unduly limited by the embodiments described below.

With reference to FIG. 1, an imaginary first virtual image display surface 310 and a second virtual image display surface 320 generated by the head-up display (hereinafter referred to as HUD) 100 of the present invention will be described. In order to facilitate the following explanation, as shown in FIG. 1, in a real space, for example, the left-right direction facing the front of the vehicle 1 is defined as an X axis (the right direction is an X axis positive direction), the vertical direction is defined as a Y axis (the upper side in the vertical direction is a Y axis positive direction), and the front-rear direction is defined as a Z axis (the rear direction is a Z axis positive direction).

As shown in FIG. 1, for example, the HUD 100 is housed in a dashboard 3 of a vehicle (one application example of a moving body) 1. For example, the HUD 100 projects display light 200 (first display light 210 and second display light 220) indicating vehicle information and the like onto a part of a front windshield (an example of a transmissive reflector) 2 of the vehicle 1. The front windshield 2 generates a predetermined eye box (not shown) by reflecting the first display light 210 and the second display light 220 toward a viewer side. By placing a viewpoint (viewer's eye position) 4 in the eye box, the viewer can visually recognize a first virtual image 311 and a second virtual image 321 on the first virtual image display surface 310 and the second virtual display surface 320 virtually generated by the HUD 100, in the front through the front windshield 2.

Assuming that a line connecting the center of the first virtual image display surface 310 and the viewpoint 4 is a line of sight axis 4a, for example, the first virtual image display surface 310 shown in FIG. 1 is provided so that an angle 310a formed by the line of sight axis 4a and the display area on the viewer side from the center of the first virtual image display surface 310 is an acute angle, and displays the first virtual image 311 viewed superimposed over a predetermined range of the road surface 5 (positions 5a to 5b in FIG. 1). Specifically, for example, the first virtual image display surface 310 is provided to be parallel to the road surface 5 (the horizontal direction consisting of X-Z plane) in FIG. 1 and to be viewed superimposed over a position 5a to a position 5b, which are 20 m and 50 m away from the eye box in a forward direction (a traveling direction of the vehicle 1). The first virtual image display surface 310 may be provided to be inclined by about ±5 degrees from an angle parallel to the road surface 5 in FIG. 1.

Assuming that a line connecting the center of the second virtual image display surface 320 and the viewpoint 4 is a line of sight axis 4 *b*, for example, the second virtual image display surface 320 shown in FIG. 1 is provided so that the angle 320 *a* formed by the line of sight axis 4 *b* and the display area on the lower side in the vertical direction from the center of the second virtual image display surface 320 is larger than the angle 310 *a* formed by the first virtual image display surface 310 and the line of sight axis 4 *a*, and displays the second virtual image 321. Specifically, for example, the second virtual image display surface 320 is provided to be substantially parallel to the direction (XY plane) vertical to the traveling direction of the vehicle 1 in FIG. 1, and to be viewed at a position 5 m to 10 m away from the eye box in a forward direction (a traveling direction of the vehicle 1). The second virtual image display surface 320 may be provided to be inclined by about ±5 degrees from an angle parallel to a direction (XY plane) vertical to the traveling direction of the vehicle 1 in FIG. 1.

FIG. 2 is a view showing an example of a scene visible from a viewer sitting in a driver's seat of the vehicle 1 including the HUD 100 shown in FIG. 1, and examples of a first virtual image 311 and a second virtual image 321. The first virtual image display surface 310 adds information to the road surface 5 by causing the first virtual image 311 such as an arrow indicating a path of the vehicle 1 to be visually recognized superimposed on an actual scene (road surface 5). The second virtual image display surface 320 displays a second virtual image 321, for example, not directly related to an actual scene such as a vehicle speed of the vehicle 1 on the display surface.

A vehicle attitude detector 6 that detects an attitude of the vehicle 1 is mounted on the vehicle 1 in FIG. 1. The vehicle attitude detector 6 estimates a pitch angle of the vehicle 1 relative to a horizontal plane (vehicle attitude) by analyzing a triaxle acceleration sensor (not shown) and a triaxle acceleration detected by the triaxle acceleration sensor, for example, and outputs vehicle attitude information G including information on the pitch angle of the vehicle 1 to the HUD 100 (control unit 70). In addition to the triaxle acceleration sensor described above, the vehicle attitude detector 6 may be composed of a height sensor (not shown) arranged in the vicinity of a suspension of the vehicle 1. At this time, the vehicle attitude detector 6 estimates the pitch angle of the vehicle 1 as described above by analyzing the height of the vehicle 1 from the ground detected by the height sensor, outputs vehicle the attitude information G including information on the pitch angle of the vehicle 1 to the HUD 100 (control unit 70). Further, the vehicle attitude detector 6 may be composed of an imaging camera (not shown) for imaging the outside of the vehicle 1 and an image analysis unit (not shown) for analyzing the captured image. At this time, the vehicle attitude detector 6 estimates a pitch angle (vehicle attitude) of the vehicle 1 from a time change of the scene included in the captured image. The method by which the vehicle attitude detector 6 obtains a pitch angle of the vehicle 1 is not limited to the above-described method, and a pitch angle of the vehicle 1 may be obtained using a known sensor or analysis method.

FIG. 3 is a diagram showing a configuration example of the HUD 100 shown in FIG. 1.

The HUD 100 in FIG. 1 includes, for example, a first image display unit 10, a second image display unit 20, a reflector 30, an actuator 40, a display synthesizer 50, a concave mirror 60, and a control unit 70. Generally, the HUD 100 is housed in a dashboard of the vehicle 1, but some or all of the first image display unit 10, the second image display unit 20, the reflector 30, the actuator 40, the display synthesizer 50, the concave mirror 60 and the control unit 70 may be arranged outside a dashboard. The HUD 100 (control unit 70) is connected to a bus 7 including a vehicle-mounted LAN (Local Area Network) or the like mounted on the vehicle 1, and can input a part or all of vehicle information from the bus 7.

The first image display unit 10 in FIG. 3 mainly comprises a first projection unit 11 composed of a projector or the like using a reflective display device such as a DMD and LCoS, and a first screen 12, which receives projection light from the first projection unit 11 to display a first image 14 and emits first display light 210 indicating the first image 14 toward the reflector 30. The first image display unit 10 displays the first image 14 on a first screen (first display surface) 12 based on image data D input from the control unit 70 to be described later, thereby displaying a first virtual image 311 on the first virtual image display surface 310 virtually generated in front of a viewer.

FIG. 4 is a view showing an example in which the first screen (first display surface) 12 shown in FIG. 3 is visually recognized from between the first screen 12 and the reflector 30 along the line of sight axis 4 *a*. In order to facilitate understanding of the following explanation, as shown in FIG. 4, the axis along the line of sight 4 *a* is defined as a dz axis, and the left-right direction of the first screen 12 is defined as a dx axis (the left direction is a dx axis positive direction), and the vertical direction of the first screen 12 is defined as a dy axis (the downward direction is a dy axis positive direction). The position in the X axis direction of the first virtual image 311 recognized by the viewer from a driver's seat of the vehicle 1 shown in FIG. 2 corresponds to the position in the dx axis direction of the first image 14 displayed on the first screen 12 shown in FIG. 4. Similarly, the position in the Y-axis direction of the first virtual image 311 recognized by the viewer from a driver's seat of the vehicle 1 shown in FIG. 2 corresponds to the position in the dy axis direction of the first virtual image 14 displayed on the first screen 12 shown in FIG. 4. Depending on the arrangement of the optical members (the first image display unit 10, the second image display unit 20, the reflector 30, the actuator 40, the display synthesizer 50, the concave mirror 60) in the HUD 100, the relationship between the above mentioned XYZ coordinate axes in a real space and the dxdydz coordinate axes used in the explanation of the first screen 12 is not limited to the above.

The first screen 12 in FIG. 3 has an area 13 capable of displaying the first image 14 as shown in FIG. 4. The area 13 of the first screen 12 capable of displaying the first image 14 is referred to as a first use area 13 for example. The first virtual image display surface 310 corresponds to the first use area 13 of the first image display unit 10, and the size of the first virtual image display surface 310 and the position in a real space where the first virtual image display surface 310 is generated can be adjusted according to the size of the first use area 13 on the first screen 12 and the position of the first use area 13 on the first screen 12. Assuming that the line connecting the center of the first use area 13 of the first screen 12 and the viewpoint 4 is the line of sight axis 4 *a*, for example, the surface of the first screen 12 is arranged to be inclined at a predetermined angle with respect to the line of sight axis 4 *a*.

Similar to the first image display unit 10 describe above, the second image display unit 20 in FIG. 3 comprises mainly a second projection unit 21 composed of a projector or the like using a reflective display device such as DMD and LCoS, and a second screen 22 which receives projection light from the second projection unit 21 to display a second image 24 and emits a second display light 220 indicating the second image 24 toward a display synthesizer 50 to be described later. The first image display unit 10 displays the second image 24 on the second screen (second display surface) 22 based on the image data D input from the control unit 70 to be described later, and thereby displays the second virtual image 321 on the virtual image display surface 320. The second screen 22 has an area 23 capable of displaying the second image 24. The area 23 of the second screen 22 capable of displaying the second image 24 is referred to as a second use area 23, for example. The second virtual image display surface 320 corresponds to the second use area 23 of the second image display unit 20, and the size of the second virtual image display surface 320 and the position in a real space where the second virtual image display surface 320 is generated can be adjusted according to the size of the second use area 23 on the second screen 22 and the position of the second use area 23 on the second screen 22. Assuming that the line connecting the center of the second use area 23 of the second screen 22 and the viewpoint 4 is the line of sight axis 4 *b*, for example, the surface of the second screen 22 is arranged to be inclined at a predetermined angle with respect to the line of sight axis 4 *b*.

The reflector (relay optics) 30 in FIG. 3 is formed, for example, of a flat plane mirror and arranged to be inclined on the optical path of the first display light 210 directed from the first image display unit 10 to the viewpoint 4, and reflects the first display light 210 emitted from the first image display unit 10 toward the display synthesizer 50. The reflector 30 is provided with the actuator 40 for rotating the reflector 30. The reflector 30 may have a curved surface, not a flat surface.

The actuator 40 is, for example, a stepping motor, a DC motor, or the like, and rotates the reflector 30 based on the vehicle attitude information G detected by the vehicle attitude detector 6 to be described later under the control of a control unit 70 to be described later, and thereby adjusts the angle and position of the first virtual image display surface 310.

The display synthesizer (relay optics) 50 in FIG. 3 comprises a flat half mirror made by forming a semi-transmissive reflection layer such as a metal reflection film or a dielectric multilayer film on one surface of a translucent substrate. The display synthesizer 50 reflects the first display light 210 reflected by the reflector 30 and emitted from the first image display unit 10, toward the concave mirror 60, and transmits the second display light 220 from the second image display unit 20, to the concave mirror 60 side. The transmittance of the display synthesizer 50 is 50%, for example, and the transmittance may be appropriately adjusted to adjust the brightness of the first virtual image 311 and the second virtual image 321.

The concave mirror 60 in FIG. 3 is arranged to be inclined on the optical paths of the first display light 210 and the second display light 220 directed from the first image display unit 10 and the second image display unit 20 to the viewpoint 4, and reflects the first display light 210 and the second display light 220 emitted from the first image display unit 10 and the second image display unit 20 toward the front windshield 2. The first screen 12 of the first image display unit 10 and the second screen 22 of the second image display unit 20 are placed closer to the concave mirror 60 than the focal length of the concave mirror 60. In more detail, the first screen 12 of the first image display unit 10 and the second image display unit 20 are placed closer to the concave mirror 60 than the focal length when the optical characteristics of the concave mirror 60 and the front windshield (transmissive reflector) 2 are combined. As a result, the first image 14 and the second image 24 displayed on the first screen 12 and the second screen 22 are displayed as the first virtual image 311 and the second virtual image 321. The optical path length of the first display light 210 from the first screen (first display surface) 12 of the first image display unit 10 to the concave mirror 60 is arranged to be longer than the optical path length of the second display light 220 from the second screen (second display surface) 22 of the second image display unit 20 to the concave mirror 60. As a result, the first virtual image 311 generated by the first image display unit 10 is formed at a position farther from the eye box than the second virtual image 321 generated by the second image display unit 20. The concave mirror 60 typically has a function of enlarging the first display light 210 and the second display light 220 generated by the first image display unit 10 and the second image display unit 20 in cooperation with the front windshield (transmissive reflector) 2, a function of correcting distortions of the first virtual image 311 and the second virtual image 321 caused by the curved surface of the front windshield 2 and visually recognizing the virtual image without distortions, and a function of forming the first virtual image 311 and the second virtual image 321 at a position away from a viewer by a predetermined distance.

FIG. 5 shows a schematic configuration example of the control unit 70 in FIG. 3. As shown in FIG. 5, the control unit 70 includes, for example, a processing unit 71, a storage unit 72, and an interface 73. The processing unit 71 comprises, for example, a CPU or a RAM, the storage unit 72 comprises, for example, a ROM, and the interface 73 comprises an input/output communication interface connected to the bus 7. For example, the interface 73 can acquire vehicle information, vehicle attitude information G and the like to be described later via the bus 7. The storage unit 72 can store data for generating image data D based on the inputted vehicle information or the like and data for generating drive data T based on the inputted vehicle attitude information G. The processing unit 71 can read data from the storage unit 72 and generate the image data D and the drive data T by executing a predetermined operation. Incidentally, the interface 73 can acquire for example the vehicle attitude information G including information on the attitude of the vehicle 1 from the vehicle attitude detector 6 via the bus 7, and has a function as a vehicle attitude information acquisition means described in the claims of the present invention. The control unit 70 may be provided inside the HUD 100, and some or all of its functions may be provided on the vehicle 1 side outside the HUD 100.

FIG. 6 is a flowchart showing an example of the operation of the HUD 100 according to this embodiment. The HUD 100 starts the processing described below, for example, when the vehicle 1 is activated, electric power is supplied to the electronic device of the vehicle 1, or when a predetermined period of time has elapsed after the activation of the vehicle 1 or the power supply to the electronic device of the vehicle 1.

In step S 01, the control unit 70 acquires the vehicle attitude information G including the information on the vehicle attitude of the vehicle 1 from the vehicle attitude detector 6.

In step S 02, the control unit 70 determines the drive data T including the drive amount of the actuator 40 corresponding to the vehicle attitude information G acquired in step S 01. Specifically, the control unit 70 reads the table data stored in advance in the storage unit 72, and determines the drive data T corresponding to the vehicle attitude information G acquired in step S 01. In step S 02, the control unit 70 may acquire the drive data T from the vehicle attitude information G by calculation using a preset calculation formula.

In step S 03, the control unit 70 Drives The Actuator 40 based on the drive data T determined in step S 02. The control unit 70 drives the actuator 40 to rotate the reflector 30 located on the optical path of the first display light 210 emitted from the first image display unit 10, thereby changing a relative angle 330 of the first image display unit 10 with respect to the second virtual image display surface 320. Specifically, for example, the control unit 70 may control the actuator 40 and rotate reflector 30 so that the first virtual image display surface 310 is parallel to the road surface 5 even when the vehicle attitude of the vehicle 1 changes.

FIGS. 7A, 7B, and 7C are diagrams showing changes of the angle 330 formed by the first virtual image display surface 310 and the second virtual image display surface 320 generated by the HUD 100 of the present embodiment. In FIGS. 7A, 7B and 7C, (a) is a diagram showing a pitch angle (vehicle attitude) of how much the pitch angle of the vehicle 1 is tilted with respect to the road surface 5 consisting of the XZ plane, (b) is a diagram showing how the reflector 30 is rotated based on the vehicle attitude shown in (a), and (c) is a diagram showing the angle 330 formed between the first virtual image display surface 310 and the second virtual image display surface 320 based on the vehicle attitude shown in (a).

FIG. 7A is a diagram showing the angle 330 formed by the first virtual image display surface 310 and the second virtual image display surface 320 in the case of a vehicle attitude 1 *r* where the vehicle 1 is parallel to the road surface 5. As shown in (a) of FIG. 7A, in the case of the vehicle attitude 1 *r* where the vehicle 1 is parallel to the road surface 5, the reflector 30 is, for example, inclined to be an angle 30 *r* shown in (b) of FIG. 7A based on the drive data T determined in step S 02 shown in FIG. 6, the first virtual image display surface 310 is adjusted to be substantially parallel to the road surface 5 as shown in (c) of FIG. 7A, and the angle 330 formed by the first virtual image display surface 310 and the second virtual image display surface 320 is an angle 330 *r* that is substantially 90 degrees. A vehicle attitude 1 *r* where the vehicle 1 shown in (a) of FIG. 7A is parallel to the road surface 5 is also referred to as a reference vehicle attitude 1 *r* in the following description. An angle 30 *r* of the reflector 30 shown in (b) of FIG. 7 is also referred to as a reference angle 30 *r*. The angle 330 *r* formed by the first virtual image display surface 310 and the second virtual image display surface 320 as shown in FIG. 7 (*c*) is also referred to as a reference angle 330 *r* in the following description.

FIG. 7B is a diagram showing the angle 330 formed by the first virtual image display surface 310 and the second virtual image display surface 320 when the front of the vehicle 1 is inclined upward in the vertical direction. As shown in (a) of FIG. 7B, in the case of a vehicle attitude 1 *u* where the front of the vehicle 1 is inclined upward in the vertical direction with respect to the reference vehicle attitude 1 *r*, the reflector 30 is, for example, inclined to be an angle 30 *u*, which is an angle rotated clockwise (CW direction) with respect to the reference angle 30 *r* as shown in (b) of FIG. 7B, based on the drive data T determined in step S 02 shown in FIG. 6, the first virtual image display surface 310 is, for example, adjusted to be substantially parallel to the road surface 5 as shown in (c) of FIG. 7B, and the angle 330 formed by the first virtual image display surface 310 and the second virtual image display surface 320 is an angle 330 *u* larger than the reference angle 330 *r*.

FIG. 7C is a diagram showing the angle 330 formed by the first virtual image display surface 310 and the second virtual image display surface 320 when the front of the vehicle 1 is inclined upward in the vertical direction. As shown in (a) of FIG. 7C, in the case of a vehicle attitude 1 *d* where the front of the vehicle 1 is inclined downward in the vertical direction with respect to the reference vehicle attitude 1 *r*, for example, the reflector 30 is inclined to be an angle 30 *d* that is an angle rotated counterclockwise (CCW direction) with respect to the reference angle 30 *r* as shown in FIG. 7 (*c*), based on the drive data T determined in step S 02 shown in FIG. 6, the first virtual image display surface 310 is adjusted to be substantially parallel to the road surface 5 as shown in FIG. 7 (*c*), and an angle formed by the first virtual image display surface 310 and the second virtual image display surface 320 is an angle 330 *d* smaller than the reference angle 330 *r*.

Referring to FIGS. 7A (c), 7B (c), and 7C (c), the angle 330 formed by the first virtual image display surface 310 and the second virtual image display surface 320 changes according to the attitude of the vehicle 1. As in the examples shown in FIGS. 7A, 7B, and 7C, for example, as the front of the vehicle 1 moves upward in the vertical direction, the angle 330 formed by the first virtual image display surface 310 and the second virtual image display surface 320 increases. On the other hand, for example, as the front of the vehicle 1 moves downward in the vertical direction, the angle 330 formed by the first virtual image display surface 310 and the second virtual image display surface 320 increases.

As a result, since the angle 330 formed by the first virtual image display surface 310 and the second virtual image display surface 320 changes based on the vehicle attitude of the vehicle 1, a viewer is allowed to recognize which one of the virtual images is the information displayed on the first virtual image display surface 310 or the second virtual image display surface 320, and it is possible to recognize more stereoscopically the first virtual image 311 and the second virtual image 321 displayed on the first virtual image display surface 310 and the second virtual image display surface 320.

In the HUD 100 according to the present embodiment, the first virtual image display surface 310 is generated inclined in the horizontal direction from the second virtual image display surface 320, and an angle with respect to an actual scene is adjusted by driving the actuator 40. The angle adjustment of the virtual image display surface (first virtual image display surface 310) inclined in the horizontal direction with respect to the actual scene gives a greater impression to the viewer for a fixed angle change of the virtual image display surface, than the angle adjustment of the virtual image display surface (first virtual image display surface 310) inclined in the vertical direction with respect to the actual scene. Therefore, by adjusting the angle of the virtual image display surface (the first virtual image display surface 310) inclined in the horizontal direction, it becomes easy to distinguish between the first virtual image 311 displayed on the first virtual image display surface 310 and the second virtual image 321 displayed on the second virtual image display surface 320. As a result, it is possible to recognize more stereoscopically the first virtual image 311 and the second virtual image 321 displayed respectively on the first virtual image display surface 310 and the second virtual image display surface 320.

Hereinafter, modifications of the embodiment of the present invention will be described. In the above description, the actuator 40 rotates the reflector 30 located on the optical path of the first display light 210 up to the display synthesizer 50, which directs the first display light 210 and the second display light 220 in the same direction, thereby changing the angle 30 formed by the first virtual image display surface 310 and the second virtual image display surface 320. However, the display synthesizer 50 may be rotated by the actuator 40. Also in this case, as in the case of rotating the reflector 30, it is possible to adjust only the angle of the first virtual image display surface 310 with respect to the actual scene, without adjusting the angle of the second virtual image display surface 320.

Further, when the angle of the first virtual image display surface 310 with respect to an actual scene is adjusted by the rotation of the reflector 30 or the display synthesizer 50, a relative position of the first virtual image display surface 310 in the vertical direction with respect to the actual scene seen by the viewer from the driver's seat is changed as shown in FIG. 2. FIGS. 8 A, 8 B, and 8 C are diagrams explaining the operation of the first image display unit 10 of the HUD 100 responding to the problem that the position of the first virtual image display surface 310 in the vertical direction with respect to an actual scene is changed by the rotation of the reflector 30 or the display synthesizer 50 based on the attitude change of the vehicle 1. These diagrams show changes in the position and the size of the first use area 13 on the first screen 12. FIG. 9 is a diagram showing the first virtual image display surface 310 (the first virtual image display surface 310 r, the first virtual image display surface 310 u, the first virtual image display surface 310 d) generated by the first image display unit 10 shown in FIGS. 8 A, 8 B, and 8 C.

The control unit 70 controls the first image display unit 10 based on the pitch angle of the vehicle 1 and thereby changes the position and the size of the first use area 13 capable of displaying the first image 14 on the first screen 12. The relationship between the pitch angle of the vehicle 1 and the position and the size of the first use area 13 on the first screen 12 will be described below.

FIG. 8 A shows the first use area 13 on the first screen 12 when the pitch angle with respect to the road surface 5 of the vehicle 1 is substantially parallel. For example, when the vehicle attitude information G obtained from the vehicle attitude detector 6 indicates that the pitch angle of the vehicle 1 with respect to the road surface 5 is substantially parallel, the first image display unit 10 determines the position of the first use area 13 on the first screen 12 to be the first use area 13 r shown in FIG. 8 A. Hereinafter, when the pitch angle with respect to the road surface 5 of the vehicle 1 shown in FIG. 8 A is substantially parallel, the first use area 13 r is also referred to as a first reference use area 13 r. The HUD 100 generates the first virtual image display surface 310 r shown in FIG. 9 corresponding to the first reference use area 13 r of the first image display unit 10.

FIG. 8 B shows the first use area 13 on the first screen 12 when the pitch angle of the vehicle 1 faces upward in the vertical direction from the road surface 5. For example, when the vehicle attitude information G obtained from the vehicle attitude detector 6 indicates that the pitch angle of the vehicle 1 with respect to the road surface 5 faces upward in the vertical direction from the road surface 5, the first image display unit 10 determines the position of the first use area 13 on the first screen 12 to be the first use area 13 u shown in FIG. 8 B.

The first use area 13 u shown in FIG. 8 B is located on the positive side of the dy axis as compared with the first reference use area 13 r. In addition, the length 131 u in the Iy axis direction in the first use area 13 u shown in FIG. 8 B is shorter than the length 13 r in the Iy axis direction in the first reference use area 13 r. As a result, as shown in FIG. 9, as compared with the first reference virtual image display surface 310 r corresponding to the first reference use area 13 r, the first virtual image area 310 u corresponding to the first use area 13 u is located on the upper side in the vertical direction on the real space (Y axis positive direction) and on the rear side (Z axis positive direction) in the traveling direction of the vehicle 1, and the length in the traveling direction of the vehicle 1 on the real space becomes short.

That is, based on the vehicle attitude information G detected by the vehicle attitude detector 6, as the pitch angle of the vehicle 1 moves upward in the vertical direction, the position of the first use area 13 of the first screen 12 is determined to be located on the dy axis positive direction side. Further, based on the vehicle attitude information G detected by the vehicle attitude detector 6, as the pitch angle of the vehicle 1 moves upward in the vertical direction, the length of the first use area 13 of the first screen 12 in the dy axis direction is determined to be short. As a result, as the pitch angle of the vehicle 1 moves upward in the vertical direction, the first virtual image display surface 310 is located on the upper side in the vertical direction in the real space and the length in the vertical direction in the real space becomes short.

FIG. 8 C shows the first use area 13 on the first screen 12 when the pitch angle of the vehicle 1 faces downward in the vertical direction from the road surface 5. For example, when the vehicle attitude information G obtained by the vehicle attitude detector 6 indicates that the pitch angle of the vehicle 1 faces downward in the vertical direction from the road surface 5, the first image display unit 10 determines the position of the first use area 13 on the first screen 12 to be the first use area 13 d shown in FIG. 8 C.

The first use area 13 d shown in FIG. 8 C is located on the negative side of the dy axis as compared with the first reference use area 13 r. In addition, the length 131 d in the Iy axis direction in the first use area 13 u shown in FIG. 8 B is longer than the length 13 r in the Iy axis direction in the first reference use area 13 r. As a result, as shown in FIG. 9, as compared with the first reference virtual image display surface 310 r corresponding to the first reference use area 13 r, the first virtual image area 310 d corresponding to the first use area 13 d is located on the lower side in the vertical direction of the real space (Y axis negative direction) and on the front side in the traveling direction of the vehicle 1 (Z axis negative direction), and the length in the traveling direction of the vehicle 1 on the real space becomes long.

In other words, based on the vehicle attitude information G detected by the vehicle attitude detector 6, as the pitch angle of the vehicle 1 moves downward in the vertical direction, the position of the first use area 13 of the first screen 12 is determined to be located on the dy axis negative direction side. Further, based on the vehicle attitude information G detected by the vehicle attitude detector 6, as the pitch angle of the vehicle 1 moves downward in the vertical direction, the length of the first use area 13 of the first screen 12 in the dy axis direction is determined to be long. As a result, as the pitch angle of the vehicle 1 moves downward in the vertical direction, the first virtual image display surface 310 is located on the lower side in the vertical direction in the real space and the length of the vehicle 1 in the traveling direction in the real space becomes long.

As described above, by rotating the reflector 30 and adjusting the position of the first use area 13 of the first image display unit 10 and the length of the dy axis, according to the change in the pitch angle (vehicle attitude) of the vehicle 1, the angle formed by the first virtual image display surface 310 and the road surface 5 is maintained before and after the change in the pitch angle (vehicle attitude) of the vehicle 1, and the positions 5 a to 5 b of the road surface 5 where the first virtual image display surface 310 is superimposed are kept constant. On the other hand, the angle and position of the second virtual image display surface 320 changes in the position and the angle formed by the first virtual image display surface 310 and the road surface 5, before and after the change in the pitch angle (vehicle attitude) of the vehicle 1. Therefore, it is easy to distinguish between the first virtual image 311 displayed on the first virtual image display surface 310 and the second virtual image 321 displayed on the second virtual image display surface 320, and it is possible to recognize more stereoscopically the first virtual image 311 and the second virtual image 321 displayed respectively on the first virtual image display surface 310 and the second virtual image display surface 320.

The adjustment of the angle 330 formed by the first virtual image display surface 310 and the second virtual image display surface 320 is done when the vehicle attitude of the vehicle 1 changes as described above. However, the adjustment may be done on the occasion of inputting a predetermined signal from the vehicle 1, inputting predetermined information from the outside of the vehicle 1, or changing the display contents of the first virtual image display surface 310 and the second virtual image display surface 320, etc. Specifically, by changing the angle 330 formed between the first virtual image display surface 310 and the second virtual image display surface 320, when an abnormality occurs in the vehicle 1 or a recommended route is input from the outside vehicle network, for example, it becomes easy to distinguish between the first virtual image 311 displayed on the first virtual image display surface 310 and the second virtual image 321 displayed on the second virtual image display surface 320. As a result, it is possible to recognize more stereoscopically the first virtual image 311 and the second virtual image 321 displayed respectively on the first virtual image display surface 310 and the second virtual image display surface 320, and it is possible to transmit information more impressively to the viewer.

Further, in the HUD 100 of the present invention, the angle 330 formed by the first virtual image display surface 310 and the second virtual image display surface 320 may be changed by rotating the display surface (the first screen 12) of the first image display unit 10 by the actuator 40.

In the actuator 40, the rotation axis AX is not necessary to be the center of the reflector 30, the display synthesizer 50, and the display surface (the first screen 12) of the first image display unit 10. The rotation axis AX may be at a predetermined position of these optical members (including an end portion). The rotation axis AX may be set at a position separated from these optical members.

FIG. 10 shows an example of visually recognizing an actual scene and the first virtual image 311 and the second virtual image 321 displayed by a modified example of the HUD 100 shown in FIG. 2, when facing the front of the vehicle 1 from the driver's seat. As shown in FIG. 10, the HUD 100 of the present invention may be configured to recognize separately the first virtual image display surface 310 generated by the first image display unit 10 and the second virtual image display surface 320 generated by the second image display unit 20. Specifically, for example, the HUD 100 according to this modification may be configured by separating an area on the display synthesizer 50 where the first display light 210 enters from the first image display unit 10 and an area on the display synthesizer 50 where the second display light 220 enters from the second image display unit 20.

In the above embodiment, there are provided the first image display unit 10 for generating the first virtual image display surface 310 and the second image display unit 20 for generating the second virtual image display surface 320. However, the image display unit may be a single unit. The HUD 100 in this modified example may adjust the angle 330 formed by the first virtual image display surface 310 and the second virtual image display surface 320, by projecting projection light from a single projection unit (not shown) to a plurality of screens (display surfaces) (not shown) and rotating one of the screens by an actuator.

In the above embodiment, the angle 330 between the first virtual image display surface 310 and the second virtual image display surface 320 is adjusted by adjusting the angle of the first virtual image display surface 310 with respect to an actual scene. However, the angle 330 between the first virtual image display surface 310 and the second virtual image display surface 320 may be adjusted by making the angle adjustment amounts different by adjusting the angles of both the first virtual image display surface 310 and the second virtual image display surface 320 with respect to an actual scene.

Further, the first image display unit 10 may comprise a transmissive display panel such as a liquid crystal display element, a self-emitting display panel such as an organic EL element, a scanning display device for scanning a laser beam, or the like.

INDUSTRIAL APPLICABILITY

The head-up display of the present invention is mounted on a moving body including, for example, a four-wheeled automobile, and available as a display for allowing a viewer to visually recognize a virtual image.

DESCRIPTION OF REFERENCE NUMERALS

1 Vehicle
2 Front windshield (Transmissive reflector)
3 Dashboard
4 View point
5 Road surface
6 Vehicle attitude detector
7 Bus
10 First image display unit
20 Second image display unit
30 Reflector (Relay optics)
40 Actuator
50 Display synthesizer (Relay optics)
60 Concave mirror
70 Control unit
71 Processing unit
72 Storage unit
73 Interface (Vehicle attitude acquisition means)
100 HUD (Head-up display)
200 Display light
210 First display light 220 Second display light
310 First virtual image display surface
311 First virtual image
320 Second virtual image display surface
321 Second virtual image
330 Angle
AX Rotation axis
D Image data
G Vehicle attitude information

The invention claimed is:

1. A head-up display mounted on a vehicle and capable of displaying a virtual image respectively on a first virtual image display surface and a second virtual image display surface by projecting display light onto a transmissive reflector, comprising:
   a first image display unit comprising a first display surface corresponding to the first virtual image display surface and emitting first display light for displaying a first virtual image from the first display surface;
   a second image display unit comprising a second display surface corresponding to the second virtual image display surface and emitting second display light for displaying a second virtual image from the second display surface;
   a relay optics that directs to the transmissive reflector the first and second display lights emitted from the first and second image display units;
   an actuator capable of adjusting an angle on a real space where the first virtual image display surface is generated, by rotating at least one of the first display surface and the relay optics; and
   a control unit that controls the actuator and changes an angle formed between the first virtual image display surface and the second virtual image display surface.

2. The head-up display according to claim 1, wherein the first virtual image display surface is inclined in a horizontal direction from the second virtual image display surface.

3. The head-up display according to claim 1, wherein the first virtual image display surface is generated at a position farther from a viewer than the second virtual image display surface.

4. The head-up display according to claim 1, wherein the first virtual image display surface is arranged parallel to a horizontal direction.

5. The head-up display according to claim 1, wherein the first virtual image display surface and the second virtual image display surface are arranged to be separated from each other as viewed from a viewer.

6. The head-up display according to claim 1, further comprising a vehicle attitude information acquisition means for acquiring vehicle attitude information including information on a vehicle attitude of the vehicle,
   the control unit drives the actuator based on the vehicle attitude information acquired by the vehicle attitude information acquisition means.

7. The head-up display according to claim 6, wherein the control unit increases a driving amount of the actuator according to a magnitude of a change in the vehicle attitude acquired by the vehicle attitude information acquisition means.

8. The head-up display according to claim 6, wherein when obtaining a change in the vehicle attitude acquired by the vehicle attitude information acquisition means, the control unit drives the actuator so that an angle formed by the first virtual image display surface and a road surface on which the vehicle travels is maintained at an angle before a behavior of the vehicle occurs.

9. The head-up display according to claim 6, wherein the control unit determines a use area to be used for displaying the image that is a part of the first display surface of the first image display unit, in accordance with a magnitude of a change in the vehicle attitude acquired by the vehicle attitude information acquisition means.

* * * * *